No. 793,940. PATENTED JULY 4, 1905.
D. S. KRAMER & T. M. WADE.
MILKING MACHINE.
APPLICATION FILED AUG. 31, 1904.
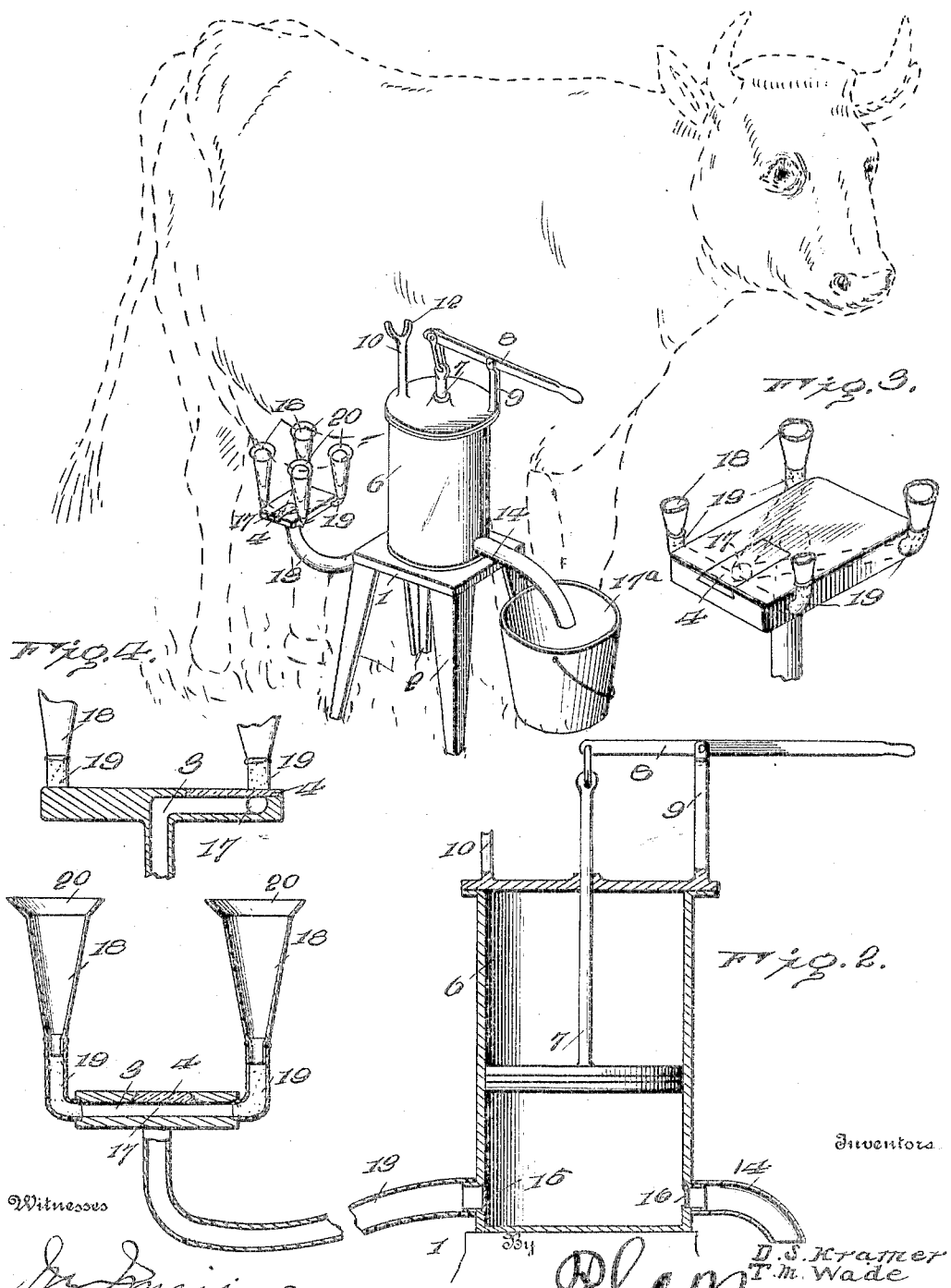

No. 793,940. Patented July 4, 1905.

UNITED STATES PATENT OFFICE.

DONALD S. KRAMER AND THADDEUS M. WADE, OF LITHOPOLIS, OHIO.

MILKING-MACHINE.

SPECIFICATION forming part of Letters Patent No. 793,940, dated July 4, 1905.

Application filed August 31, 1904. Serial No. 222,874.

*To all whom it may concern:*

Be it known that we, DONALD S. KRAMER and THADDEUS M. WADE, citizens of the United States, residing at Lithopolis, in the county of Fairfield and State of Ohio, have invented certain new and useful Improvements in Milking-Machines, of which the following is a specification.

This invention deals with the type of machines for extracting the lacteal fluid from the udder of a cow by vacuum-pressure and is designed to provide a contrivance of simple and effective construction and which will not irritate or vex the animal during the milking operation or produce serious results.

For a full description of the invention and the merits thereof and also to acquire a knowledge of the details of construction of the means for effecting the result reference is to be had to the following description and accompanying drawings.

While the essential and characteristic features of the invention are susceptible of modification, still the preferred embodiment of the invention is illustrated in the accompanying drawings, in which—

Figure 1 is a perspective view of a milking-machine embodying the invention, showing it in active operation. Fig. 2 is a detail section of the machine. Fig. 3 is a perspective view of the teat-cups and their support on a larger scale. Fig. 4 is a detail section of the teat-cup support.

Corresponding and like parts are referred to in the following description and indicated in all the views of the drawings by the same reference characters.

The support in general appearance resembles a stool or stand and comprises a head 1 and legs 2. Upon this support or stand is mounted a vacuum-creating device or air-pump, which in its simplest form, as shown, consists of a cylinder 6 and piston 7. A lever 8, fulcrumed to a standard 9 of the cylinder 6, is connected with the stem of the piston 7 for operating the latter when desired. A standard 10, projected upward from the cylinder 6, is forked at its upper end, as shown at 12, to receive the pipe and support carrying the teat-cups. Pipes 13 and 14 connect with the lower portion of the cylinder 6, an inwardly-opening valve 15 coöperating with the pipe 13 and an upwardly-opening valve 16 coöperating with the pipe 14. The element 13 is the induction-pipe and the element 14 the eduction-pipe and is adapted to deliver the milk into the pail 17.

A plate or support is attached to the outer end of the induction-pipe 13. A compartment 3 is provided in the plate and is closed at its upper side by means of a transparent plate 4, preferably of glass, so as to admit of observing the passage of the milk through the compartment 3 during operation of the machine. The plate 4 is removably fitted to admit of access to the interior of the compartment 3 for cleaning or other purposes. The pipe 13 connects with the plate so as to communicate with one end of the compartment 3. A series of ducts 17 radiate from the opposite end portion of the compartment 3 and may be tubes or other form of passages. The teat-cups 18 are connected at their lower ends with the outer ends of the ducts or passages 17 by means of flexible connections 19, which will admit of relative movement of the teat-cups at their free ends, so as to adapt themselves to the position of the teats upon different cows.

The teat-cups 18 are arranged in a cluster and are of tapering form and flare at their upper ends, as indicated at 20, so as to come in contact with the udder and prevent undue pressure thereon while at the same time maintaining firm connection, which is essential to the effectiveness of the apparatus. The cups 18 are of such relative size as to comfortably receive the teats without producing lateral pressure thereon to obstruct the free flow of the lacteal fluid, and the flared ends 20 bear against the udder, preventing drawing of the same into the cups when the piston 7 is moved to create a vacuum-pressure within the cylinder and cups.

As indicated in Fig. 1, the air-pump is supported upon the stand, and the lower end of the educting-pipe 14 is arranged to discharge into the pail or receptacle 17ᵃ when the cups 18 are fitted to the teats and closed against the udder. Upon moving the piston 7 upward in the cylinder 6 the valve 16 closes and the valve 15 opens, thereby permitting the creation of a vacuum within the teat-cups 18 and causing a suction upon the teats, which causes the milk to flow from the udder into the cups 18, thence through pipe 13 into the cylinder 6. A downward pressure upon the piston 7 closes valve 15 and opens valve 16 and discharges the milk from the cylinder 6 into the pail 17. An upward stroke of the piston 7 again creates a vacuum-pressure and usually results in completely extracting the milk from the udder, the parts being of such relative size as to necessitate but two strokes of the piston to effect the milking of each cow. The stoppage of the flow of the milk at the end of the operation may be observed through the transparent plate 4, as will be readily comprehended. When not in position, the teat-cups, their support, and the pipe 13 are held out of the way by placing the pipe 13 in the fork 12 of the standard 10.

Having thus described the invention, what is claimed as new is—

1. In a milking-machine, a head provided with a compartment, a transparent plate closing a side of said compartment to admit of both access thereto and observation of the milk in its passage therethrough, and milk extracting and discharging means connected with said compartment to cause circulation of the milk therethrough, substantially as described.

2. In a milking-machine, the combination of a support provided with a compartment having a portion closed by means of a transparent plate, ducts radiating from an end portion of said compartment, teat-cups connected with the outer ends of said ducts and an induction-pipe connected with the opposite end portion of said compartment, substantially as set forth.

3. A milking-machine comprising a stand, a vacuum-creating device mounted upon said stand and having an inlet and an outlet, pipes communicating with said inlet and outlet, inwardly and upwardly opening valves controlling respectively the said inlet and outlet, a head provided with a compartment having a portion closed by means of a transparent plate, ducts radiating from said compartment and teat-cups for connection with the outer ends of said ducts, substantially as set forth.

In testimony whereof we affix our signatures in presence of two witnesses.

DONALD S. KRAMER. [L. S.]
  THADDEUS M. WADE. [L. S.]

Witnesses:
  FRANK E. WILSON,
  CHARLES E. OYLER.